INVENTOR.
EDWARD C. FOX
BY Eugene M. Whitacre
ATTORNEY

INVENTOR.
EDWARD C. FOX
BY Eugene M. Whitacre
ATTORNEY 3,229,048
Patented Jan. 11, 1966

3,229,048

RECORDING SYSTEM

Edward C. Fox, Levittown, Pa., assignor to Radio Corporation of America, a corporation of Delaware Filed July 24, 1962, Ser. No. 212,070
9 Claims. (Cl. 179—100.4)

This invention relates to a system for producing a sound recording by means of a grooved sound track. Such sound recordings are made, for example, on disc records or tape-shaped sound carriers by means of a continuous spiral groove having undulations therein representative of the recorded sound wave.

It has been recognized heretofore that distortion, known as tracing distortion, results in the reproduction of a phonograph record since the shape of the recording stylus differs from that of the reproducing stylus. It has been found to be impractical to make the recording and reproducing styli the same shape. An analysis of tracing distortion shows that lateral cut records are superior to vertical cut records (hill-and-dale). In lateral cut records, the two groove walls, moving in opposite directions relative to the reproducing stylus center, form a push-pull system which tends to eliminate the even order harmonic and intermodulation components of tracing distortion. In vertical cut records, vertical-lateral stereophonic records, or in 45–45 type stereophonic records the cancellation of even order harmonic and intermodulation distortion does not take place and the tracing distortion problem becomes significant. A discussion of tracing distortion as applied to 45–45 type stereophonic records is set forth in an article entitled "Tracing Distortion in Stereophonic Disc Recording" by M. S. Corrington appearing in the RCA Review for June 1958 at pages 216–231.

It is an object of this invention to provide an improved recording system of the type including a grooved sound track.

Another object of this invention is to provide an improved recording system for phonograph records, or the like, wherein the tracing distortion problem is significantly reduced.

In a recording system embodying the invention the signal to be recorded is predistorted in a manner such that the reproducing stylus tip follows the desired path to reproduce the desired signal with a substantial reduction in the amount of tracing distortion as compared to known types of recording systems. In other words, the center of the reproducing stylus tip should trace a path corresponding to the voltage wave form of the stylus:

(1) Tracing distortion is caused by the fact that the center of the reproducing stylus leads or lags its point of contact with the record groove; and (2) is variably displaced in the direction of groove modulation; both (1) and (2) vary as a function of rate of change of signal voltage. The signal to be recorded is predistorted by means including a tapped delay line, the maximum delay of which is related to the diameter of the reproduction stylus, the groove velocity and the maximum slope of the recorded groove. A plurality of gate circuit means are respectively connected between respective ones of the taps on the delay line and an output circuit, so that only one of the gate circuits passes signals at a time. The gate circuits are biased or otherwise preconditioned so that in the standby condition the gate circuit connected to an intermediate tap is biased to a gating condition and the gate circuits connected to taps on either side of the intermediate tap are biased progressively less toward the gating condition. When a signal is applied to the delay line the particular gate circuit which will convey the signal to the output circuit will be determined by the direction of the input voltage excursion, i.e. positive going or negative going, and the rate of change of the input voltage. In addition a D.-C. error voltage may be added to the signal passing through each gate, the amplitude of the error voltage for any particular gate being such as to compensate for the displacement of the stylus in the direction of groove modulation.

The distorted signal appearing at the output circuit is then applied to the cutter head of a recorder. The phasing of the distorted signal as applied to the cutter provides a groove, which can be translated by known types of phonograph pickups to reproduce the recording substantially without tracing distortions.

The principles of the invention are also applicable to record reproducing systems for reproducing existing records in which the signal recorded was not predistorted as described above. The reproduced signal is passed through a post distorting system including a tapped delay line as described above, and then passed to the reproducing system utilization circuit.

In accordance with an optional feature of the invention the time delay of the delay circuit may be manually or automatically adjusted to exhibit different time delay characteristics for different positions of the cutter head with respect to the center of the record. It will be understood that the groove velocity near the outer periphery of the record, as it passes the cutter head, is greater than the groove velocity near the center of the record. Accordingly, the time delay of the tapped delay line is increased as the cutter head moves closer to the center of the record.

The novel features which are considered to be characteristic of this invention are set forth with particularity in the appended claims. The invention, itself, however both as to its organization and method of operation will best be understood from the following description in which:

Figure 1:
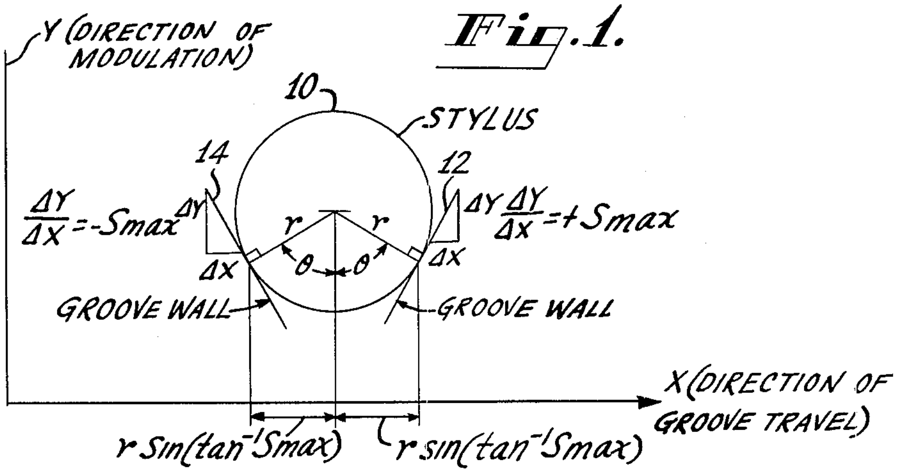
FIGURE 1 is a diagrammatic view of a spherical stylus tip showing the point of contact thereof with groove walls of maximum positive and negative slope.

Referring to the drawing wherein like reference characters will be used to identify like parts in the various figures thereof, and in particular to FIGURE 1, a reproducing stylus tip 10 is diagrammatically shown in contact with positive and negative slopes 12 and 14 of an undulating record groove. The stylus tip, although shown as a sphere, is representative of known types of stylus having a spherical tip of radius $r$. The maximum positive and negative slopes 12 and 14 of the groove wall are represented as $$S=\frac{\Delta y}{\Delta x}$$

where $y$ is the direction of modulation and $x$ is the direction of groove travel. By simple trigonometry, it can be seen that if the slope of the groove wall is confined to the limits $\pm S_{max}$, then the point of contact between the groove wall and the stylus may be anywhere within the limits $\pm r \sin (\tan^{-1} S_{max})$ in the direction $x_1$ of groove travel, relative to the center of the stylus.

Thus, the center of the stylus either leads or lags the point of contact with the record groove depending on whether the groove slope in the direction of groove travel is negative or positive. If the groove undulations represent the waveform of the recorded signal, then the resultant lead or lag of the stylus center from the point of contact produces tracing distortion. It may be presumed that the output signal from the reproducer is a function of the displacement of the center of the sytlus.

In addition to the lead or lag of the stylus center from the point of contact, it can be seen from FIGURE 1 that there is a stylus displacement error, since the stylus center is displaced vertically above the point of contact be a distance $z$ which is proportional to $\sqrt{r^2-x^2}$.

Figure 2:
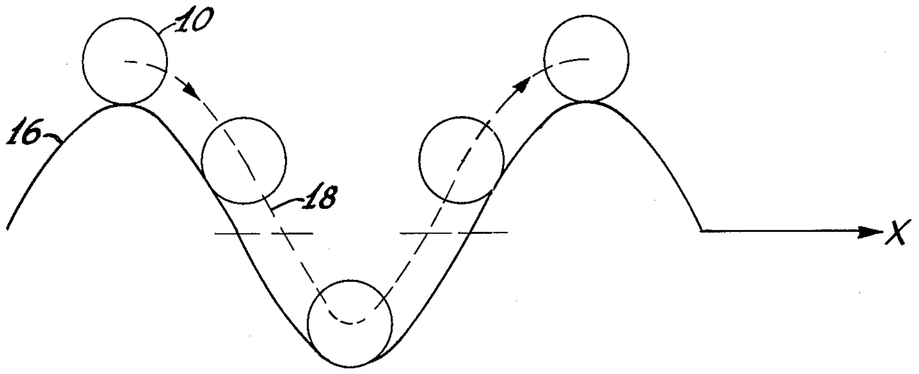
FIGURE 2 is a diagrammatic view of a spherical stylus tip tracing a vertically cut record groove recorded with a sine wave to illustrate one aspect of tracing distortion.

The reasons why tracing distortion occurs will be more clearly understood by reference to FIGURE 2 which diagrammatically illustrates an undulating groove 16 traced by a spherical stylus tip 10. The diagrammatic views of FIGURES 2 and 3 correspond to sectional views of vertically cut records. Although it is understood that the record rotates relative to the stylus and in a direction from right to left as viewed in these figures, the relative motion is depicted in the drawings by moving the stylus with respect to the record from left to right.

The recorded signal is a sine wave of voltage, and the groove undulation closely represents a sine wave. As the stylus tip 10 traces the groove 16, its center defines a path shown by the dotted line 18. The output from the reproducer, not shown, driven by the stylus 10 will be a voltage having a waveform represented by the dotted line 18. It is clear that the output signal represented by the dotted line 18 departs from the recorded signal represented by the groove 16 in that output signal peaks are broader and the valleys narrower than those of the recorded signal. The departure of the output signal waveform from that of the input signal is what is meant by tracing distortion.

Figure 3:
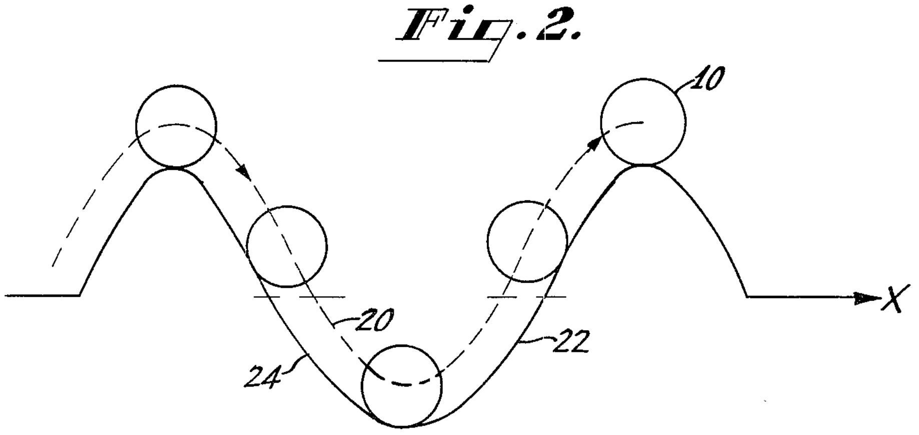
FIGURE 3 is a diagrammatic view of a spherical stylus tip tracing a vertically cut record groove which has been recorded with a predistorted sine wave in a manner to reduce the amount of tracing distorting.

One way of getting the output signal to conform to the input signal is to distort the input signal in a predetermined manner before it is recorded. As shown in FIGURE 3, the sine wave signal was distorted before recording to produce groove undulations which have rather sharp peaks and broad valleys. It will be seen that the center of the stylus 10 in tracing the groove defines a sine wave, and hence the output voltage from the reproducer will also be a sine wave as represented by the dotted line 20.

The path 18 traced by the stylus center of FIGURE 2 is the same shape as the groove undulation of FIGURE 3, and the path 20 traced by the stylus center of FIGURE 3 corresponds to the groove undulations of FIGURE 2. It may be said that the groove shape and the paths traced by the stylus are complementary. Thus, if the signal to be recorded is predistorted in accordance with this complementary relationship, tracing distortion in reproduction can be reduced or eliminated.

In order to record a sine wave in a manner that a sine wave is reproduced by a phonograph record without distortion, it can be seen from FIGURE 3 that the portion 24 of the groove where the stylus rides down hill must be advanced in time, and the portion 22 of the groove where the stylus rides uphill must be delayed in time relative to that of the sine wave recording of FIGURE 2.

The signal to be recorded is predistorted in a complementary distorter before it is applied to the cutter head of the recorder. The complementary distorter includes a tapped delay line connected to advance and delay signals applied thereto so that the resultant signal output from the distorter bears the aforementioned complementary relationship to the applied signal. In addition a D.-C. voltage component is added to the signal to correct for displacement distortion. The amplitude of the D.-C. voltage component added to the signal is a function of the rate of change of applied signal voltage.

Figures 4, 5, 6, 7, 8:
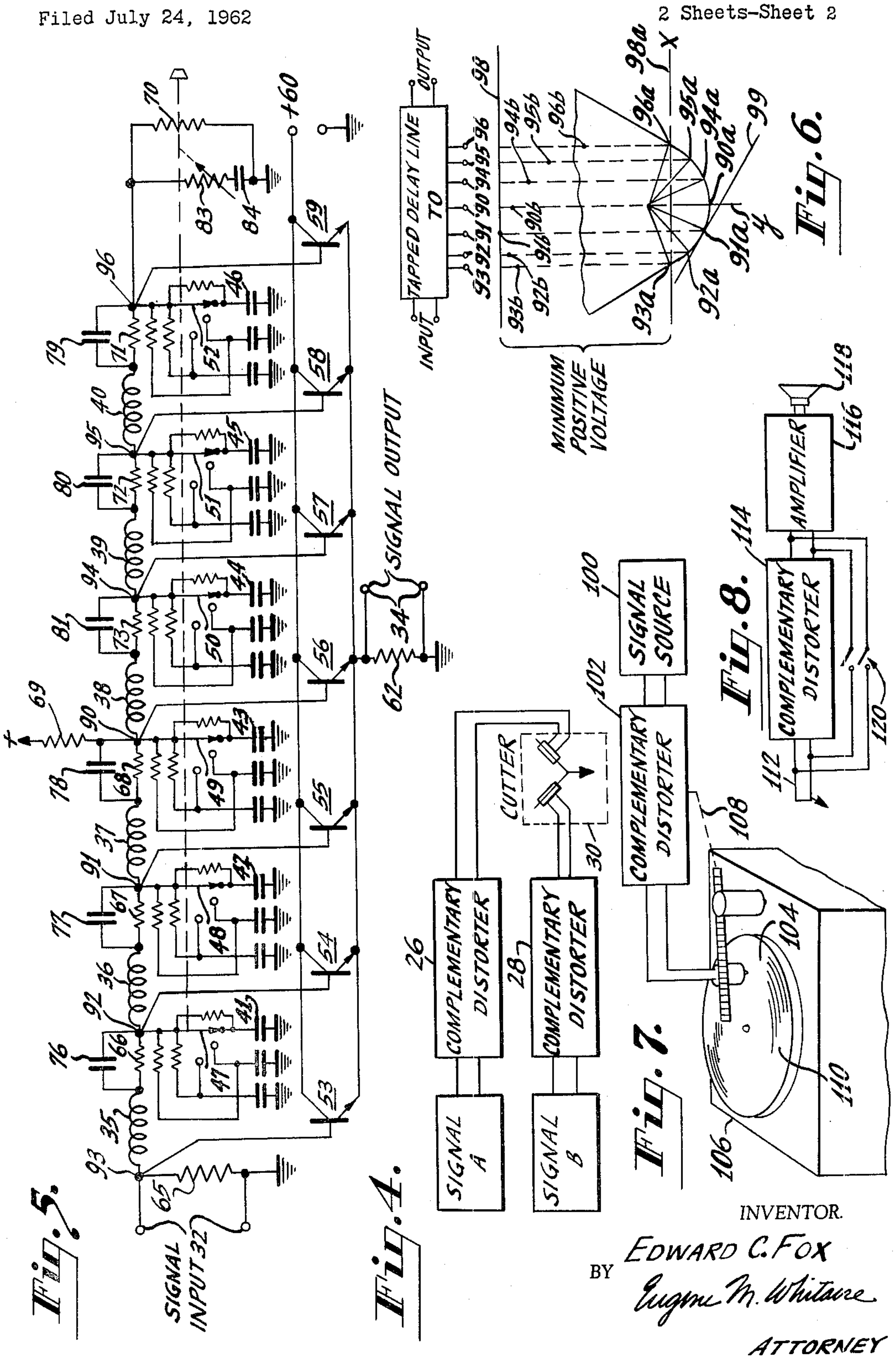
FIGURE 4 is a block diagram of a system for recording a 45–45 type of stereophonic record in accordance with the invention such that the resultant record may be reproduced by known types of reproducers with a minimum amount of tracing distortion.
FIGURE 5 is a schematic circuit diagram of a complementary distorter circuit for use with the recording system of FIGURE 4.
FIGURE 6 is a diagrammatic view of a spherical stylus tip illustrating one manner for driving the relative biasing voltages for use in the complementary distorter circuit of FIGURE 5.
FIGURE 7 is a block diagram of a recording system in accordance with a feature of the invention wherein the delay of the tapped delay line of the complementary distorter is varied as a function of the location of the cutter head with respect to the center of the turntable.
FIGURE 8 is a simplified block diagram of a grooved record reproducing system embodying another feature of the invention.

The recording system shown in FIGURE 4 is for recording 45–45 stereophonic records. Such a recording system provides a recording having two groove walls at right angles and each at 45° to the record surface. Each of the groove walls is recorded with one of the stereophonically related signals. A source of stereophonic signals A and B which may comprise spaced microphones or prerecorded stereophonic signals on a magnetic tape are coupled respectively to complementary distorters 26 and 28. The complementary distorters 26 and 28 are connected to drive separate coils of a 45—45 cutter head 30. The apparatus used in the recording system may be of any known type, and may include additional amplifiers or other signal translating circuits, with the signals A and B passed through the complementary distorters 26 and 28 respectively.

One type of complementary distorter which may be used in the combination of FIGURE 4 is shown in the schematic circuit diagram of FIGURE 5. The complementary distorter includes a pair of input terminals 32 for connection to a source of signals to be recorded, and a pair of output terminals 34 for connection to a cutter head. A tapped delay line including a plurality of series inductors 35, 36, 37, 38, 39 and 40 and shunt capacitors 41, 42, 43, 44, 45 and 46 is connected to the input terminals 32. The shunt capacitors are respectively connected to the junctions of the various inductors through switches 47, 48, 49, 50, 51 and 52 as shown. The switches 47–52 are ganged for unicontrol operation as indicated by the dashed line, and can be adjusted to select other values of shunt capacitors and thus change the delay characteristics of the tapped delay line.

The delay line includes seven taps which comprise respectively the junctions between the serially connected inductors 35–40, and the end terminals of the inductors 35 and 40. A plurality of gating transistors 53, 54, 55, 56, 57, 58 and 59 each having a base, emitter and collector electrode, connect the seven taps of the delay line to the signal output terminals 34. The emitter to collector current paths of the gating transistors 53–59 are connected in parallel, with the collector electrodes connected to the positive terminal of an operating potential supply 60. A resistor 62 is connected across the output terminals 34 and comprises a common emitter current return path for the transistors 53–59.

The base electrodes of the transistors 53–59 are connected to the respective seven taps of the delay line to receive the signal voltage appearing at the tap and an appropriate D.C. biasing voltage. A first voltage divider including resistors 65, 66, 67, 68 and 69 connected between ground and the positive terminal of the operating potential supply, and a second voltage divider including resistors 70, 71, 72, 73 and 69 also connected between ground and the positive operating potential supply terminal provides the D.C. biasing voltage for the transistors 53–59. The resistor 66 which is serially connected between the inductors 35 and 36 is bypassed for signal frequencies by a capacitor 76. In like manner, the resistors 67, 68 and 71–73 are also bypassed for signal frequencies respectively by the capacitors 77, 78, 79, 80 and 81. It will be noted that the greatest forward bias is applied to the transistor 56, with progressively less forward bias applied to the transistors 55, 54 and 53, and to the transistors 57, 58 and 59. In the absence of input signals, the biasing and relative component values are such that only the transistor 56 conducts. Under the no signal condition, the voltage developed across the resistor 62 by the transistor 56 current is sufficient to maintain the other transistors cut-off.

The delay line is terminated by its characteristic impedance by the resistor 70 in parallel with a resistor 83. The resistor 83 is connected in series with a D.C. blocking capacitor 84 which is of low impedance to applied signals. The resistors 65 and 70 in the predistorter of FIGURE 5, are of equal value, and develop sufficient D.C. voltage thereacross to keep all of the delay line taps positive with respect to ground for the largest anticipated signal amplitude. The resistor 69 is made of large resistance value compared to the characteristic impedance of the delay line to prevent loading thereof.

To determine the maximum delay required of the delay line, attention is again directed to FIGURE 1. As noted above, with a stylus radius $r$, and a maximum groove slope $S_{max}$, the center of the stylus may lead or lag the point of contact of the stylus anywhere within the range $x+\pm r \sin(\tan^{-1}S_{max})$ in the direction of groove travel. If the groove is passing the center of the stylus with a velocity $v$, then $x=vt$, and the displacement of the stylus at a given time may be said to be determined by groove displacement which passed the center of the stylus up to $$\frac{r \sin(\tan^{-1}S_{max})}{v}$$

ago, or which will pass the center of the stylus up to $$\frac{r \sin(\tan^{-1}S_{max})}{v}$$

in the future. The total time period over which the stylus center may lead or lag the point of contact with the groove walls is $$\frac{2r \sin(\tan^{-1}S_{max})}{v}$$

and this time period is the total delay which should be provided by the tapped delay line.

With reference to FIGURE 5, the center tap point 90 may be considered to provide zero delay, and the tap points 91, 92 and 93 provide successively more advance with the maximum advance at the tap point 93 of $$+\frac{r \sin(\tan^{-1}S_{max})}{v}$$

The tap points 94, 95, and 96 provide successively more delay of the signal with the maximum delay $$-\frac{r \sin(\tan^{-1}S_{max})}{v}$$

at the terminal 96. The amount of advance at the terminal 91 and delay at the terminal 94 are equal and correspond to the time that the center of the stylus leads or lags the point of contact with the record groove, when the stylus is contacting the record groove at the points 91$a$ and 94$a$ of FIGURE 6. In a like manner the advance at the terminal 92 and delay at the terminal 95 are equal and correspond to the time the center of the stylus leads or lags the point of contact when the stylus contacts the record groove at the points 92$a$ and 95$a$ of FIGURE 6.

Since the slope, S, of a record groove corresponds to the rate of change of a signal to be recorded, the amount that the stylus center will lead or lag its point of contact with the record groove is a function of rate of change of signal voltage as noted in the preceding formula. Thus, the amount that the signal voltage must be advanced or delayed to produce record groove undulations which will cause the stylus center to trace a path corresponding to the undistorted signal voltage waveform, is a function of the rate of change of the signal voltage. A signal voltage which will cause the cutter to dig deeper into the record must be advanced, and a signal which will cause the cutter to reduce the depth of cut must be delayed as can be seen with reference to FIGURES 2 and 3.

In the present case it is assumed that the cutter is phased so that a positive going signal from the output terminals 34 of the complementary distorter causes the cutter to dig deeper into the record, and a negative going signal causes the cutter to reduce the depth of cut.

When the rate of change of the signal to be recorded as applied to the input terminals 52 of the complementary distorter is zero, the signal is gated through the gating transistor 56, since this transistor has the greatest forward bias and maintains the other transistors cut-off. Signals passed through the transistor 56 are at reference time, and although delayed with respect to the original signal applied to the input terminals 32 are assumed to have zero delay or advance. A positive going signal voltage applied to the input terminals 32, readjusts the bias at the seven tap points such that one of the tap points 91–93 becomes more postiive than any of the other tap points so that the gating transistor connected therewith conducts and maintains the other transistors cut-off. The particular tap point which will be most positive will depend on the rate of change of signal voltage, with the greatest rate of change causing the terminal 93 to become most positive, thereby gating the input signal through the transistor 53. Signals passed by the transistor 53 are advanced with respect to signals passed by the transistor 56 by a time $$\frac{\sin r(\tan^{-1}S)}{v}$$

A negative going signal voltage applied to the input terminals 32, readjust the bias at the seven taps such that one of the tap points 94–96 becomes more positive than any of the other taps so that the transistor connected therewith conducts and maintains the other transistor cut-off. The maximum rate of change of a negative going signal will cause the tap 96 to become most positive, thereby gating the input signal through the transistor 59. Signals passed by the transistor 59 are delayed with respect to signals passed by the transistor 56 by an amount $$\frac{\sin r(\tan^{-1}S)}{v}$$

From the foregoing it will be understood that the instantaneous voltage at any of the taps 90–96 of the delay line is the sum of the quiescent D.-C. bias voltage, and a dynamic component related to the rate of change of signal voltage and the polarity in which the voltage is going. The different values of D.-C. voltage at the taps 90–96 compensate for displacement error of the stylus center above the point of contact with the record. To ascertain the proper D.-C. bias voltage, it should be noted that each of the tap points to the right and left of the center tap point correspond to a predetermined advance or delay of the signal with respect to that appearing at the tap 90, which advance or delay time, in turn corresponds to a particular point of contact of the stylus with a record groove as is indicated in FIGURE 6. The D.-C. voltage at the taps 90–96 is made proportional to the length of the lines projected from the points **90*a*–96*a* to the line 98 of FIGURE 6. To determine actual values of voltage, it should be noted that the minimum positive D.-C. voltage at any of the taps 90–96 should exceed the largest expected signal amplitude to prevent reverse biasing of the gate transistors. This minimum positive voltage may be applied to the end terminals 96 and 93**. The maximum signal input voltage to the tapped delay line causes a known maximum movement of the cutter stylus, and the ratio of signal voltage to stylus movement (expressed in volts per mil) can be determined. This ratio can be controlled by adjusting the amount of amplification or attenuation between the tapped delay line and the cutter.

The distance in mils between the line **98*a* and the points 90*a*–96*a* of FIGURE 6 can be easily determined since the radius of the playback stylus is known. By multiplying the projected distance at any of the taps by the volts per mil ratio, and adding the result to the minimum positive D.-C. voltage, the total required D.-C. voltage at that tap can be ascertained. The difference in D.-C. voltage at the various taps, which is a function of the volts per mil ratio, should be sufficiently great to prevent two of the gating transistors from conducting at a time. In a practical circuit of the type shown in FIGURE 5 with a germanium transistor and a 47K emitter resistor 62**, .05 volt difference between the taps produces excellent results.

The D.-C. bias voltage at the taps 90–96 serve two purposes. First, it adds to the dynamic signal voltage to properly determine which gate transistor passes the signal, and second it adds a D.-C. component to the signal to compensate for displacement error of the pickup stylus. With respect to the first point, a given rate of change of voltage may be represented by a line 99 tangent to any one of the points **90*a*–96*a*. The tangent line 99 represents a positive going voltage. With such a voltage, to determine the bias at each of the tap points, project lines vertically from the line 99 through each of the taps, the length of each projection being proportional to the biasing voltage at the tap point. The relative voltages at the various tap points are then represented by the points 90*b* to 96*b*. Thus a rate of change of voltage represented by the line 99 will cause the terminal 91 to become most positive, and the transistor 55** will conduct.

With regard to the second point concerning a displacement error correction, it can be seen that contact of the sylus with the record at point **90*a* of FIGURE 6 produces an error displacement of the center of the stylus which is a vertical distance equal to the radius of the stylus. As used herein vertical refers to the direction of groove modulation. The vertical displacement error is decreased when the stylus engages the record at point 91*a* and is still further decreased at points 92*a* and 93*a*. Since as noted above, the D.-C. voltages appearing at the various taps is in proportion to the lengths of the lines projected vertically from the points 90*a*–96*a***, this D.-C. voltage adds to the dynamic signal voltage to correctly compensate for the displacement error.

In the recording of a sine wave as shown in FIGURE 3, the maximum negative voltage, which corresponds to the recorded peak at the left hand side of the figure, has zero rate of change of voltage and the signal is passed by the gating transistor 56. As the signal begins to go positive, causing the cutter to cut deeper into the record, the signal is successively passed by the transistors 55, 54 and 53, assuming that the signal achieves the maximum expected rate of change of voltage. This action causes the signal at the output terminals 34 to be advanced a maximum amount. As the signal approaches its positive peak, the signal is passed successively by the transistors 54 and 55 to provide successively less advance, and at the positive peak, the transistor 56 is operative. The positive peak of the signals represents the deepest portion of the groove of FIGURE 3. As the signal then goes negative, it is passed successively by the transistors 57, 58, 59 and back through transistors 58, 57, 56, to provide an increasing and then decreasing amount of delay. The recorded groove undulation corresponds to a phase inverted version of the distorted signal, and permits tracing by the stylus such that the center of the stylus traces a path corresponding to the waveform of the undistorted signal.

As noted above the amount of delay required in the tapped delay line is a function of the velocity of the record groove with respect to the stylus. The record groove velocity relative to the stylus is greater near the periphery than it is near the center of a record. In order to provide optimum tracing distortion reduction over the entire surface of the record it may be desirable to change the tapped delay line characteristics as a function of the distance of the recorder head from the center of the record as is shown in FIGURE 7. In the system of FIGURE 7, signals from a signal source 100 are fed through a complementary distorter 102 which may be of the type shown in FIGURE 5. The complementary distorter is coupled to drive a properly phased record cutter head 104 which forms part of a record cutting lathe 106. The record cutter lathe 106 is mechanically coupled to the complementary distorter 102, as indicated by the dashed line 108, to increase the delay characteristics of the tapped delay line as the record cutter head 104 moves toward the center of the record 110 on the turntable.

The tapped delay line characteristic may be altered by adjusting the values of the shunt capacitors 41–46 of FIGURE 5, and the terminating resistor 83 in accordance with the groove diameter. The tapped delay line adjustment may be stepped to switch in successively larger values of shunt capacitors 41–46 by means of the switches 47–52, or the shunt capacitors may be made continuously variable at a rate or maintain optimum distortion cancellation. The terminating resistor 83 may be made continuously variable as shown, or a plurality of terminating resistors may be provided and selectively switched in to maintain optimum termination of the delay line. As shown in FIGURE 5 resistors may be connected between the various fixed contact points of the rotor of the switches so that all of the capacitors will maintain the charge of the particular tap point with which they are associated, and thereby prevent a transient or click voltage from being generated when the switches 47–52 are thrown from one position to another.

The principles of the invention are applicable to phonograph reproducing systems as shown in FIGURE 8. A record which has not been recorded with a complementary predistorter system of the invention is transduced by a pickup device 112 which drives a complementary distorter 114. If desired, suitable amplifier stages, not shown, may be included between the pickup device and the distorter. The distorter which may be of the type shown in FIGURE 5 is coupled to a power amplifier 116 which drives a loudspeaker 118. Tracing distortion produced by the pickup device 112 tracking a record, not shown, is reduced by the distorter 114 in complementary manner to that described above. If desired the tapped delay line of the distorter may be made adjustable in the manner described in connection with FIGURES 5 and 7. When a record is to be played which has been recorded with a complementary predistorted signal as described, a switch 120 may be closed to bypass the complementary distorter 114.

What is claimed is:

1. A system for reducing tracing distortion in the transduction of phonograph records, comprising:

a complementary distorter having an input circuit and an output circuit, said complementary distorter including a multiple tap delay line coupled to said input circuit, and means for passing signals from one of the taps of said delay line to said output circuit depending on the rate of change of voltage applied to said input circuit, and an electromechanical transducer and means coupling said electromechanical transducer to one of said input and output circuits.

2. A recording system including, means providing a source of signals to be recorded, a complementary distorter coupled to receive signals from said source, said complementary distorter including, (1) a delay line having a plurality of taps corresponding to different periods of delay, (2) an output circuit, (3) a plurality of gate circuits each coupled between one of said taps and said output circuit, and (4) means for biasing said gate circuits such that the gate circuit connected to taps on either side of an intermediate one of said taps are biased progressively further away from the gating condition.

3. A system for reducing tracing distortion in the transduction of phonograph records comprising:

a complementary distorter having an input circuit and an output circuit, said complementary distorter including a delay line having a plurality of taps corresponding to different periods of delay, means for passing signals from one of said plurality of taps to said output circuit depending on the rate of change of voltage applied to said input circuit, the maximum delay of said delay line being proportional to the maximum rate of change of signal voltage, the groove velocity of the phonograph record and the radius of the reproducing stylus, means for varying the delay of said delay line and the periods of delay between said plurality of taps as a function of record groove velocity, an electromechanical transducer, and means coupling said transducer to one of said input and output circuits.

4. A recording system for producing a sound recording by means of a grooved sound track comprising:

means providing a source of signals to be recorded, a delay line including a plurality of series connected inductors forming a plurality of tap points at the junctions thereof coupled to receive signals from said source, said delay line having a delay substantially equal to $$\frac{2r \sin (\tan^{-1} S_{max})}{v}$$

where $r$ is the radius of the reproducing stylus, $(\tan^{-1} S_{max})$ is the angle whose tangent corresponds to the maximum rate of change of voltage $$\frac{de}{dt}$$

and $v$ is the velocity of the record groove, a plurality of gating transistors each including base, emitter and collector electrodes, means connecting the collector electrodes of said transistors in common, means connecting the emitter electrodes of said transistors in common, means connecting the base electrodes of said transistors to different ones of said plurality of tap points, a source of operating potential and an impedance element connected in series in the order named between said collector and emitter electrodes, biasing means connected to provide a forward bias between the base and emitter electrodes of one of said transistors whose base is connected to an intermediate tap point of said delay line and progressively less forward bias between the base and emitter electrodes of transistors whose bases are connected to tap points progressively further away in either direction from said intermediate tapping point, the minimum forward bias at any given point greater than the maximum signal voltage and the greatest forward bias being at an intermediate tap, and the D.-C. voltages at taps on either side of said intermediate tap being proportional to the displacement error caused by the rate of changes of voltage of signals from said source.

5. A complementary distorter for phonograph recording and reproducing systems, comprising:

an input circuit for receiving signals to be recorded, delay means coupled to said input circuit, an output circuit, means coupling said delay means to said output circuit, and means for controlling the amount of delay exhibited by said delay means as a function of the rate of change of signal voltage applied to said input circuit.

6. A complementary distorter for phonograph recording and reproducing systems, comprising:

an input circuit for receiving signals to be recorded, a delay line coupled to said input circuit, said delay line having a plurality of taps each corresponding to a predetermined time delay, an output circuit, and means for coupling one of said taps to said output circuit to advance or delay the signal applied to said output circuit with reference to the signals appearing at an intermediate tap on said delay line in a manner to compensate for tracing distortion.

7. The method of making a grooved stereophonic phonograph disk record which may be reproduced by a phonograph pickup with reduced vertical tracing distortion comprising the steps of:

providing a source of audio frequency electrical signals corresponding to audio frequency source signals to be recorded in a disk phonograph record at an angle greater than zero degrees to the plane of said record;

modifying said electrical signals in the complementary manner to the vertical tracing distortion otherwise resulting from differences in the shape of the recording and reproducing styli by relatively delaying or advancing said electrical signals as a function of the polarity direction in which said electrical signals are going, with the amount of said relative delay or advance being a function of the rate of change of said electrical signals;

increasing the relative delay or advance for a given rate of change for those electrical signals which are to be recorded nearer the center of said disk record; and using said modified electrical signals to make a stereophonic phonograph record which can be reproduced with less vertical tracing distortion by a phonograph pickup.

8. The method of making a grooved stereophonic phonograph record as defined in claim 7, wherein the step of increasing the relative delay or advance for a given rate of change for those electrical signals which are to be recorded nearer the center of said disk record is effected in a stepwise manner.

9. A complementary distorter for phonograph recording systems, comprising:

an input circuit for receiving signals to be recorded, a delay means coupled to said input circuit, said delay means having a plurality of output terminals each corresponding to different predetermined time delay, an output circuit, individual gate circuit means coupled between said output terminals and said output circuit, means for biasing a gate circuit means coupled between an output terminal corresponding to an intermediate delay to a gating condition in the absence of signals to be recorded, means for biasing gate circuit means coupled between output terminals corresponding to delays greater or less than said intermediate delay further away from a gating condition in proportion to the absolute value of the difference in delay between a given output terminal and said intermediate terminal in the absence of signals to be recorded, means interconnecting said gate circuit means to permit only one of said gate circuit means at a time to pass signals to be recorded to said output circuit.

References Cited by the Examiner

UNITED STATES PATENTS

| | | | |
|---|---|---|---|
| 2,284,744 | 6/1942 | Kellogg ---------- | 179—100.4 |
| 2,960,568 | 11/1960 | Leyton ----------- | 179—100.2 |

IRVING L. SRAGOW, *Primary Examiner.*

BERNARD KONICK, *Examiner.*